US008432833B2

(12) United States Patent
Rustagi et al.

(10) Patent No.: US 8,432,833 B2
(45) Date of Patent: Apr. 30, 2013

(54) AUTO MEP ID ASSIGNMENT WITHIN CFM MAINTENANCE ASSOCIATION

(75) Inventors: Sunesh Rustagi, Cupertino, CA (US); Roopa Bayar, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/439,104

(22) Filed: Apr. 4, 2012

(65) Prior Publication Data

US 2012/0189020 A1 Jul. 26, 2012

Related U.S. Application Data

(63) Continuation of application No. 12/140,716, filed on Jun. 17, 2008, now Pat. No. 8,175,008.

(51) Int. Cl.
*H04L 12/24* (2006.01)
(52) U.S. Cl.
USPC ........... 370/255; 709/220; 709/222; 709/223; 709/224
(58) Field of Classification Search ............. 370/255
See application file for complete search history.

(56) References Cited

U.S. PATENT DOCUMENTS

| | | |
|---|---|---|
| 7,496,739 B1 | 2/2009 | Raghavan et al. |
| 2006/0253611 A1 | 11/2006 | Hu et al. |
| 2008/0027898 A1 | 1/2008 | Matsuo et al. |
| 2009/0129354 A1 | 5/2009 | Gupta et al. |

OTHER PUBLICATIONS

IEEE P802.1ag/D8, Draft Standard for Local and Metropolitan Area Networks—Amendment 5 to 802.1Q Virtual Bridged Local Area Networks: Connectivity Fault Management; Feb. 8, 2007.*
Co-pending U.S. Appl. No. 12/140,716, filed Jun. 17, 2008, Sunesh Rustagi et al., entitled "Auto Med ID Assignment Within CFM Maintenance Association".
LAN MAN Standards Committee of the IEEE Computer Society, Interworking Task Group of IEEE.802.1, IEEE P802.1ag/D8.1, Draft Standard for Local Metropolitan Area Networks—Virtual Bridged Local Area Networks—Amendment 5: Connectivity Fault Management, Jun. 18, 2007, 255 pages.

* cited by examiner

*Primary Examiner* — Huy D Vu
*Assistant Examiner* — Joseph Bednash
(74) *Attorney, Agent, or Firm* — Harrity & Harrity, LLP

(57) ABSTRACT

A device may include a maintenance association endpoint configured to select a maintenance association endpoint identifier, transmit the maintenance association endpoint identifier to one or more other maintenance association endpoints, and automatically assign the maintenance association endpoint identifier to the maintenance association endpoint if it is determined that the maintenance association endpoint identifier is available based on a conflict message received from one of the one more other maintenance association endpoints.

20 Claims, 8 Drawing Sheets

AUTO MEP ID ASSIGNMENT WITHIN CFM MAINTENANCE ASSOCIATION

RELATED APPLICATION

This application is a continuation of U.S. patent application Ser. No. 12/140,716, filed on Jun. 17, 2008, the disclosure of which is incorporated by reference herein.

BACKGROUND

Operations, administration, and management (OAM) refers to the processes, tools, standards, etc., involved in operating, administering and maintaining a system. As technologies continue to advance, OAM is becoming a challenging endeavor. For example, Ethernet technology is evolving from a Local Area Network (LAN) platform to one suitable for deployment in a Metropolitan Area Network (MAN) and Wide Area Network (WAN). Unfortunately, OAM functions associated with a traditional Ethernet are deficient and do not translate well into this type of network model. For example, Ethernet-based OAM functions do not include remote monitoring for multiple domains that may exist in disparate geographical locations, such as in a MAN or a WAN.

Various standards (e.g., Institute of Electrical and Electronics Engineers (IEEE) 802.1ag and the International Telecommunication Union (ITU)-T Y.1731) have emerged to facilitate OAM functionality in these carrier-class Ethernets. In the realm of connectivity fault management (CFM) services, these standards provide for, among other things, fault detection, fault verification, fault isolation, fault notification, and fault recovery, at layer two.

In the IEEE 802.1ag standard, a maintenance association end point (MEP) corresponds to a CFM entity that can generate and receive CFM messages and track responses. Each MEP may be identified by a MEP identifier (MEP ID) that is unique in the layer 2. Existing techniques for MEP ID allocation is an administrative issue and not detailed in the IEEE 802.1ag standard. For example, a network administrator may need to configure the MEP ID for a MEP.

SUMMARY

According to one aspect, a method may include receiving, by a first entity, a message from each entity of a group of second entities to which the first entity is a member, the message including a network identifier associated with each second entity, selecting a first network identifier for the first entity based on the network identifier associated with each second entity, transmitting a first message including the first network identifier to each entity of the second entities to determine whether the first network identifier is available, and assigning the first network identifier to the first entity if a conflict message is not received from any of the second entities in response to the first message.

According to another aspect, a device may include a maintenance association endpoint to select a maintenance association endpoint identifier, transmit the maintenance association endpoint identifier to one or more other maintenance association endpoints, and automatically assign the maintenance association endpoint identifier to the maintenance association endpoint if it is determined that the maintenance association endpoint identifier is available.

According to still another aspect, a computer-readable memory device having stored thereon instructions, executable by at least one processor, the computer-readable memory device may include an instruction to select a first network identifier based on one or more messages received, an instruction to transmit a first message that includes the first network identifier, an instruction to determine whether the first network identifier is available, and an instruction to auto-configure the first network identifier with respect to a device if it is determined that the first network identifier is available.

According to yet another aspect, a line interface may include a maintenance association endpoint, the maintenance association endpoint may include means for receiving messages from one or more other maintenance association endpoints, means for selecting a maintenance association identifier based on the received messages, means for transmitting the maintenance association endpoint identifier to the one or more other maintenance association endpoints, means for determining whether the maintenance association endpoint identifier is available based on whether response messages are received from the one or more other maintenance association endpoints, and means for auto-configuring the maintenance association endpoint identifier if it is determined that the maintenance association endpoint identifier is available.

BRIEF DESCRIPTION OF THE DRAWINGS

The accompanying drawings, which are incorporated in and constitute a part of this specification, illustrate one or more embodiments described herein and, together with the description, explain these embodiments of the invention. In the drawings.

DETAILED DESCRIPTION

Figure 1A:
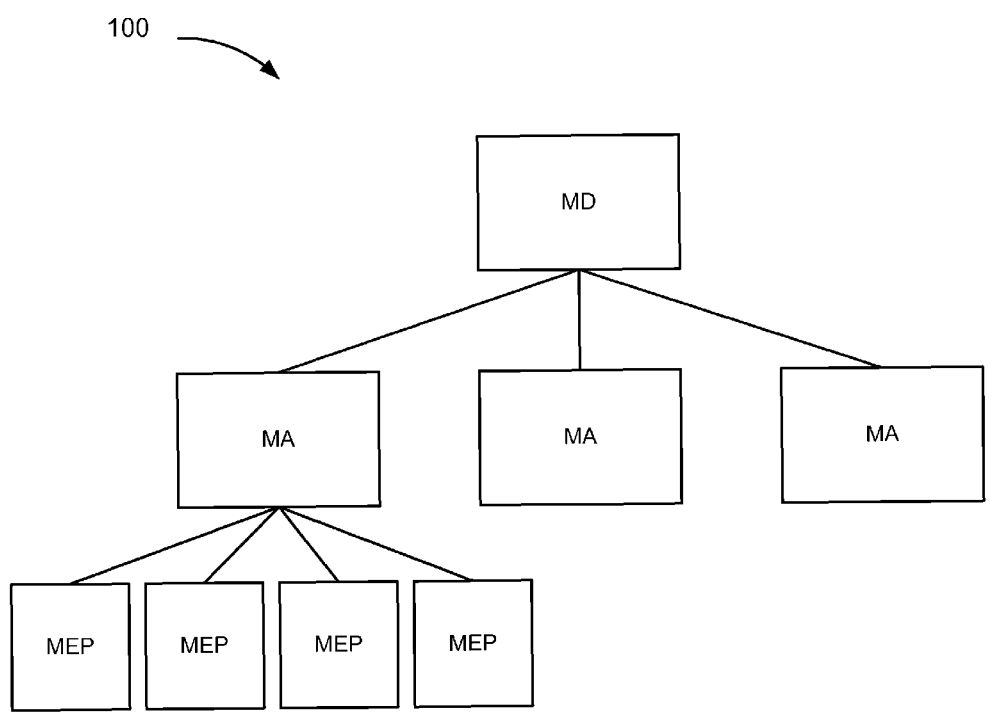
FIGS. 1A and 1B are diagrams illustrating concepts associated with a communication standard.

The following detailed description refers to the accompanying drawings. The same reference numbers in different drawings may identify the same or similar elements. Also, the following description does not limit the invention.

The term "may" is used throughout this application and is intended to be interpreted, for example, as "having the potential to," "configured to," or "being able," and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

The concepts described herein provide for auto-provisioning of network IDs (e.g., MEP IDs) to entities (e.g., MEPs). Although implementations associated with the concepts described herein may be described in reference to the IEEE 802.1ag standard, these concepts are not dependent on employing this particular standard. Rather, the concepts described herein may be implemented in other protocols or standards. Additionally, although implementations associated with the concepts described herein may be described in reference to an Ethernet-based environment, these concepts are not dependent on employing this particular architectural model.

Given the expansive nature of the IEEE 802.1ag standard, it will be appreciated that this description is not intended to be construed as an exhaustive treatment of the standard. However, the IEEE 802.1ag standard defines various entities, relationships, processes, etc., related to CFM. In general, the IEEE 802.1ag standard provides CFM capabilities useful to virtual bridged LANs. Also, the IEEE 802.1ag standard provides CFM services where multiple nested domains over a bridged network or a network combination of bridged networks may exist and where each domain may be managed by different administrative organizations.

As previously described, the IEEE 802.1ag standard (hereinafter the IEEE standard) specifies one type of CFM entity as a MEP. A MEP may be uniquely identified by a MEP ID (e.g., an integer value). The IEEE standard also specifies another type of CFM entity referred to as a maintenance domain intermediate point (MIP). The MIP may generate CFM messages, but only in response to received CFM messages. A maintenance point (MP) may refer to either a MEP or a MIP.

As further specified in the IEEE standard, a maintenance association (MA) may include a set of MEPs configured with the same MA ID and maintenance domain (MD) level. A MA ID (e.g., a maintenance domain name and a short MA name) may uniquely identify a MA. A MD may include a network or a part of a network for which faults in connectivity may be managed. The MD may include one or more MAs. The MD level may include an identifier (e.g., an integer value) in a field of the CFM message to identify which MD the CFM message belongs. The IEEE standard permits eight MD levels. The utilization of MD levels enables, among other things, the separation of responsibility for network administration.

Figure 1B:
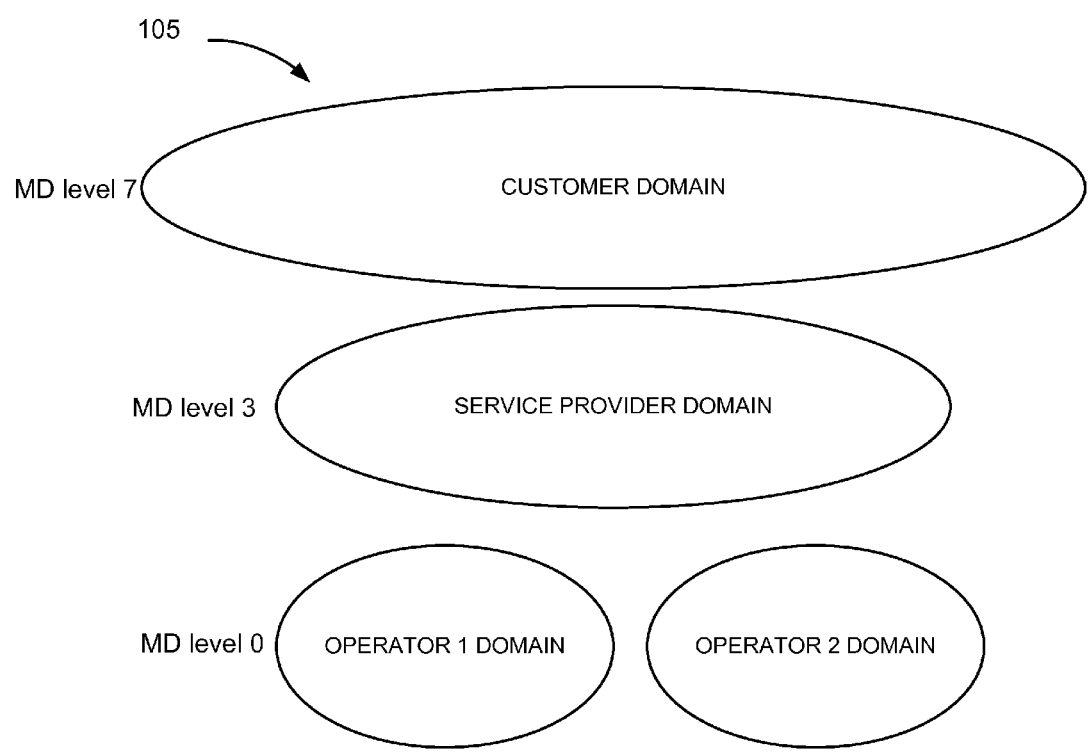

FIG. 1A is a diagram illustrating an exemplary hierarchical relationship 100 among MEPs, MAs, and MDs. For example, a MA may include one or multiple MEPs and a MD may include one or multiple MAs. FIG. 1B is a diagram illustrating an exemplary multi-domain scenario 105 in which a customer may subscribe to the services of a provider and the service provider, in turn, may subscribe to the services of multiple operators. As illustrated in FIG. 1B, the operator domain may be at a MD level 0, the service provider domain may be at a MD level 3, and a customer domain may be at a MD level 7.

According to the IEEE standard, a MEP may be configured in either a bridge port or an end station (e.g., a user terminal) attachment to a LAN. For purposes of discussion, the MEP will be described in reference to a network device, such as a bridge or a switch.

Exemplary Environment

Figure 2:
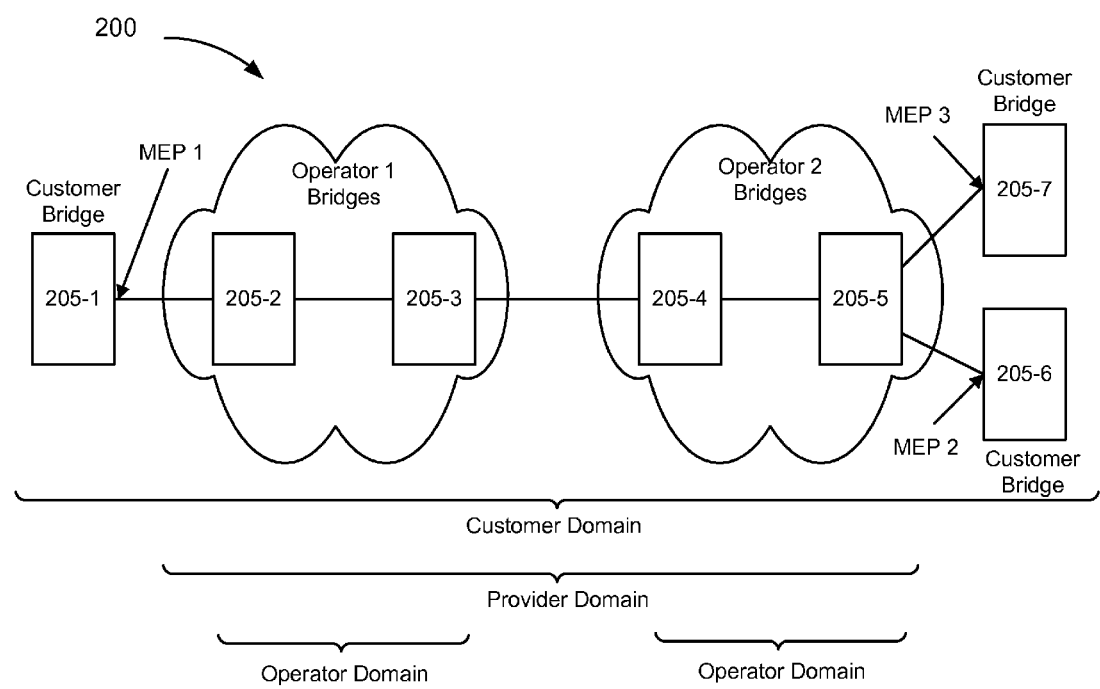
FIG. 2 is a diagram illustrating an exemplary environment in which concepts described herein may be implemented.

FIG. 2 is a diagram illustrating an exemplary environment 200 in which concepts described herein may be implemented. As illustrated, environment 200 may include network devices, such as bridges 205-1, 205-2, 205-3, 205-4, 205-5, 205-6, and 205-7. Bridges 205-1, 205-2, 205-3, 205-4, 205-5, 205-6 and 205-7 may be collectively referred to as bridges 205. Bridges 205 may be communicatively coupled. For example, bridges 205 may form a LAN, a MAN or a WAN. Bridges 205 may include MEPs and/or MIPs.

For purposes of discussion, assume that bridges 205-1 and 205-6 include MEPs 1 and 2. Also assume that a customer adds bridge 205-7 and MEP 3 to environment 200 to form a MA among MEPs 1, 2 and 3. However, the customer does not assign a MEP ID to MEP 3.

In an exemplary auto-provisioning MEP ID process, MEP 3 may listen for continuity check messages (CCMs) from MEPs 1 and 2. Under the IEEE standard, MEPs may periodically multicast CCMs (analogous to HELLO messages) to one another to detect connectivity failures and discover other MEPs. The CCM may include a MEP ID of the sending MEP.

After the listening period, MEP 3 may learn the MEP IDs of MEPs 1 and 2. MEP 3 may then automatically select a MEP ID to assign itself. For example, MEP 3 may select an unused MEP ID from a MEP ID pool. In another implementation, the MEP ID selection process may be different, as described below. Once the MEP ID is selected, MEP 3 may insert the MEP ID in a type, length, and value (TLV) field of a CCM. MEP 3 may multicast the CCM to MEPs 1 and 2.

MEPs 1 and 2 may receive the CCM and determine whether a conflict exists. For example, MEPs 1 and 2 may reference a database that includes, among other things, MEP IDs and may determine whether the MEP ID is already taken. If no conflict exists, then MEP 3 may utilize the selected MEP ID and the databases of MEP IDs may be updated. However, if a conflict is discovered, a MEP (e.g., MEP 1 or MEP 2) may issue a conflict response in a CCM to MEP 3. MEP 3 may receive the CCM indicating a conflict and select another MEP ID. This process may continue until a MEP ID is approved.

As a result of the foregoing, network IDs, such as MEP IDs, may be auto-provisioned. The auto-provisioning of MEP IDs may significantly reduce configuration overhead and the likelihood of configuring MEP IDs incorrectly. Additionally, the auto-provisioning of MEP IDs may be performed without the need to synchronize among devices to check for available MEP IDs. Since the concepts have been broadly described in relation to FIG. 2, variations to the above concepts will be discussed further below.

Although FIG. 2 illustrates an exemplary environment 200, in other implementations, environment 200 may include additional, different, or fewer devices than those illustrated in FIG. 2. Thus, it will be appreciated that environment 200 is exemplary in terms of, among other things, the number of devices, the connections between and/or among the devices, etc. The connections in FIG. 2 may be direct, indirect, as well as wired and/or wireless.

Exemplary Components of the Network Device

Figure 3A:
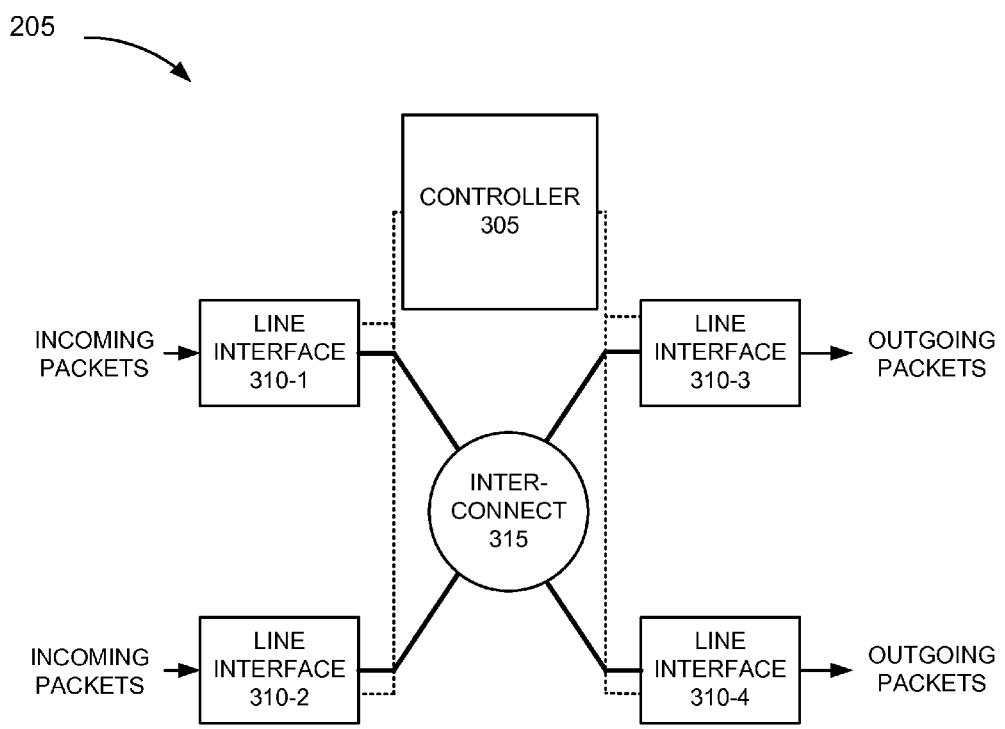
FIGS. 3A and 3B are diagrams illustrating exemplary components of a device that may correspond to a network device depicted in FIG. 2.

FIG. 3A is a diagram illustrating exemplary components of a network device depicted in FIG. 2. A component, as used herein, may include, for example, hardware, software and hardware, firmware, etc. As illustrated, bridge 205 may include, among other things, a controller 305, line interfaces 310-1, 310-2, 310-3, and 310-4 (collectively referred to as line interfaces 310), and an interconnect 315.

Controller 305 may include, for example, a general purpose processor, a microprocessor, a controller, a data processor, a network processor, a co-processor, an application specific integrated circuit (ASIC), a field programmable gate array (FPGA), discrete hardware components, and/or some other type of component that may interpret and/or execute instructions. Controller 305 may assist in forwarding packets and/or handling data flows. The term "packet," as used herein, is intended to be broadly interpreted to include a datagram, a frame, a cell, or any other type of delivery unit or mechanism.

Line interfaces 310 may include, for example, a network interface card (NIC), a communication port, an infrared interface, a Personal Computer Memory Card International Association (PCMCIA) card, a line card, an ASIC, or another type of line interface component. Line interfaces 310 may be capable of receiving packets from other devices and transmitting packets to other devices in environment 200. Line interfaces 310 may implement industry promulgated protocol standards, non-standard, proprietary, and/or customized interface protocols. One or more of line interfaces 310 may include a MEP, as described in greater detail below.

Interconnect 315 may include, for example, a switching fabric or another form of a connection (e.g., a bus) for conveying packets to and from line interfaces 310.

Although FIG. 3A illustrates exemplary components of bridge 205, in other implementations fewer, additional, or different components may be utilized. Further, in other implementations, the configuration of the components, as depicted in FIG. 3A, may be different. It will be appreciated that bridge 205 may be capable of providing services not specifically described herein. For example, bridge 205 may be capable of providing authentication and/or encryption services.

Exemplary MEP

Figure 3B:
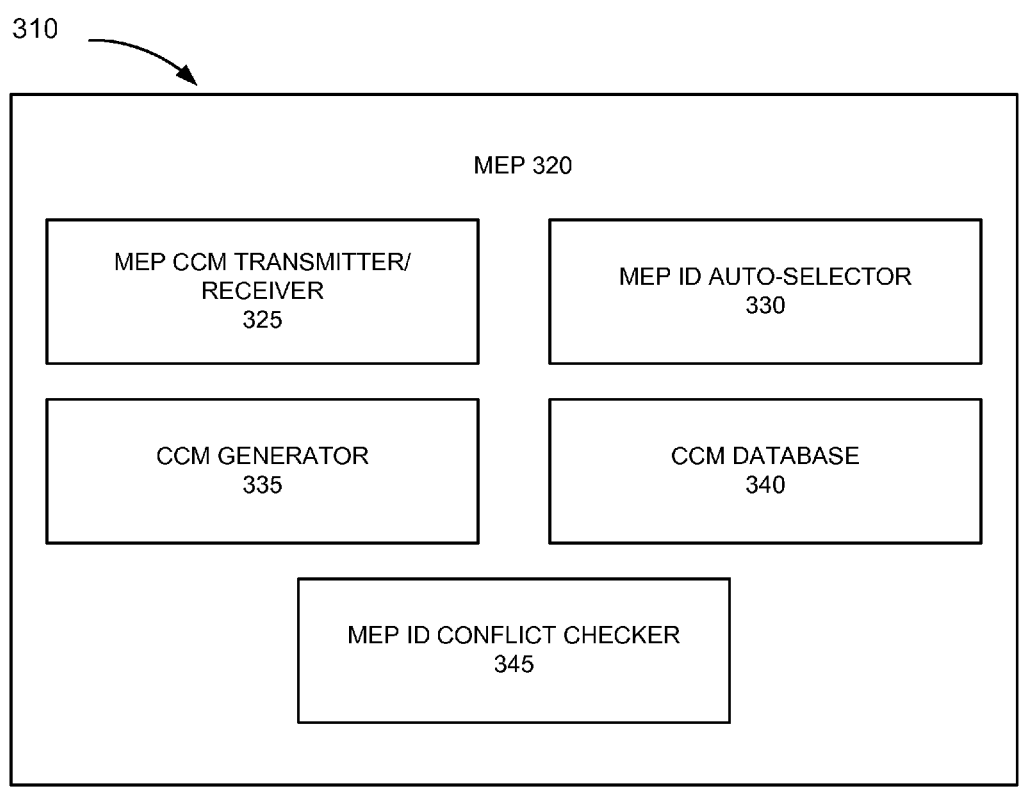

FIG. 3B is a diagram illustrating exemplary components of a MEP 320. As illustrated, MEP 320 may include a MEP CCM transmitter/receiver 325, a MEP ID auto-selector 330, a CCM generator 335, a CCM database 340, and a MEP ID conflict checker 345. MEP 320 may be implemented in one or more line interfaces 310. In other implementations, MEP 320 may be implemented elsewhere in bridge 205.

MEP CCM transmitter/receiver 325 may include a component for transmitting CCMs to other MEPs and receiving CCMs from other MEPs.

MEP ID auto-selector 330 may include a component for selecting a MEP ID. In one implementation, MEP-ID auto-selector 330 may consult CCM database 340 to determine a MEP ID that is not being used by another MEP, as will be described in greater detail below. In another implementation, MEP ID auto-selector 330 may select a MEP ID based on a hashing function. For example, MEP ID auto-selector 330 may hash a Media Access Control (MAC) address to select a MEP ID that is not being used by another MEP.

CCM generator 335 may include a component for generating a CCM. CCM database 340 may include a component for storing information related to CCMs. For example, CCM database 340 may include MEP IDs of other MEPs and information relating to a range of MEP ID values. For example, a network administration may configure the range of MEP ID values. Thus, a MEP may have a MEP ID within a particular range of values. Under the IEEE standard, it is suggested a MEP ID range from 1 to 8191.

MEP ID conflict checker 345 may include a component for determining whether a MEP ID is available for use. For example, MEP ID conflict checker 345 may determine that a MEP ID is available for use based on CCM database 340.

Although FIG. 3B illustrates exemplary components of MEP 320, in other implementations fewer, additional, or different components may be utilized.

Exemplary CCM

As previously described, a MEP may periodically transmit CCMs to other MEPs. The period at which CCMs may be transmitted is user-configurable. Under the IEEE standard, the periodicity ranges from 3.3 milliseconds to 10 minutes. As will be described in greater detail below in connection with FIG. 5, the auto-provisioning of a MEP ID may include advertising a MEP ID in a CCM to other MEPs to determine whether the MEP ID is available. If a conflict exists, a MEP may indicate the existence of a conflict in a CCM.

Figure 4A:
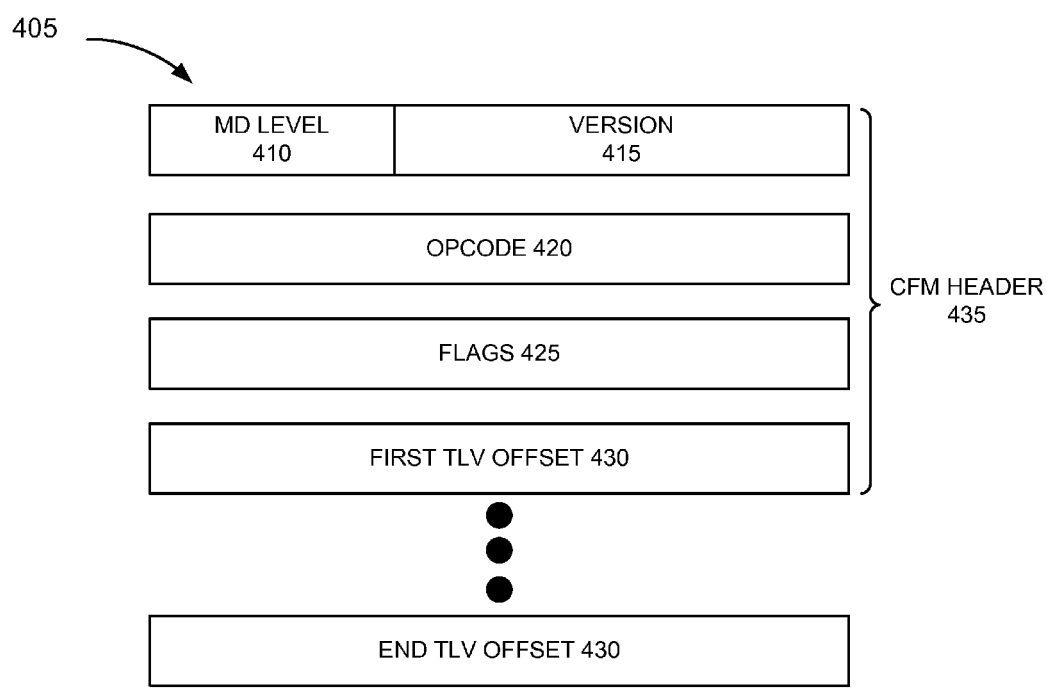
FIGS. 4A and 4B are diagrams illustrating exemplary message formats that may be applicable to the concepts described herein.
Figure 4B:
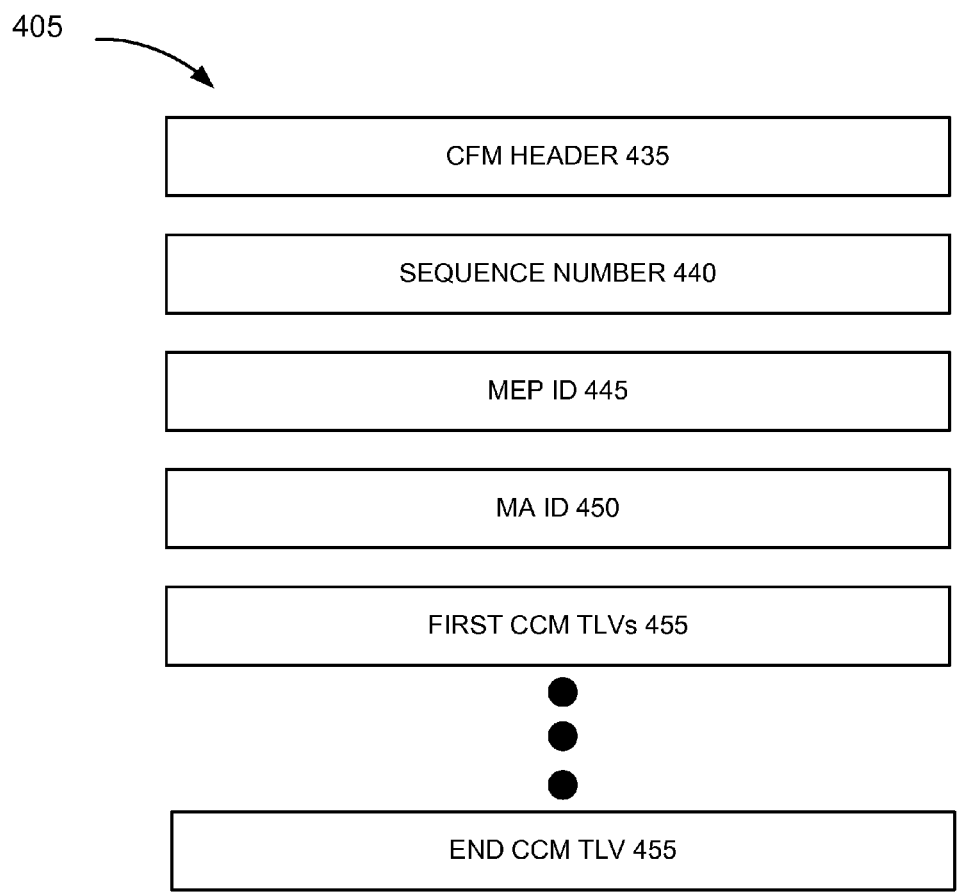

FIG. 4A is a diagram illustrating an exemplary CFM packet 405 that may be employed. In one implementation, CFM packet 405 may be included in a data field of a packet (e.g., an Ethernet frame). FIG. 4B is a diagram of an exemplary CCM included with CFM packet 405.

As illustrated in FIG. 4A, CFM packet 405 may include a MD level field 410, a version field 415, an OpCode field 420, a flags field 425, and TLV fields 430. MD level field 410 may indicate the MD level of the packet (e.g., CFM packet 405). For example, as previously described, maintenance domains may be assigned with different MD levels. Version field 415 may indicate the version of the protocol (e.g., IEEE 802.1ag) being used and/or the format of the CFM packet to which it conforms. OpCode field 420 may specify the format and meaning of the remainder of CFM packet 405. For example, there are various types of CFM messages (e.g., CCM, Loopback Reply (LBR), Loopback Message (LBM), etc.) and depending on the value in OpCode field 420, CFM packet 405 may correspond to a particular type of CFM message. Flags field 425 may indicate various types of information depending on the value in OpCode field 420. When CFM packet 405 includes a CCM, flags field 425 may indicate, among other things, CCM interval information (i.e., the periodicity of CCM transmission). TLV fields 430 may indicate optional information. First TLV offset 430 may have a predefined value depending on the type of CFM message.

Typically, the first 4 octets of CFM packet 405 are considered header information. Thus, MD level field 410, version field 415, OpCode field 420, flags field 425 and first TLV offset field 430 may be referred to collectively as CFM header 435.

As described above, depending on the value of OpCode field 420, CFM packet 405 may correspond to any number of different CFM messages. FIG. 4B illustrates an exemplary CCM when OpCode field 420 contains a value corresponding to a CCM.

Referring to FIG. 4B, an exemplary CCM may include CFM header 435. CFM header 435 may include information similar to the information described above in connection with FIG. 4A. Additionally, an exemplary CCM may include a sequence number field 440, a MEP ID field 445, a MA ID field 450, and CCM TLV fields 455. Sequence number field 440 may indicate a sequence number for the CCM and may increment if the CCM has to be re-transmitted. MEP ID field 445 may indicate the MEP ID of the transmitting MEP. In one implementation, the MEP ID may range from 1 to 8191. MA ID field 450 may indicate the MA ID of the transmitting MEP. In one implementation, MA ID field 450 may include information, such as MD name format, MD name, Short MA name, etc. CCM TLVs 455 may include optional information, organization-specific information, etc.

Although FIGS. 4A and 4B illustrate an exemplary CFM packet 405 that may include a CCM, in other implementations fewer, additional, or different fields may be utilized for implementing the concepts described herein.

Exemplary Process

Unlike existing techniques, MEP IDs may be automatically provisioned based on the concepts described herein. Described below is an exemplary process for auto-provisioning MEP IDs.

Figure 5:
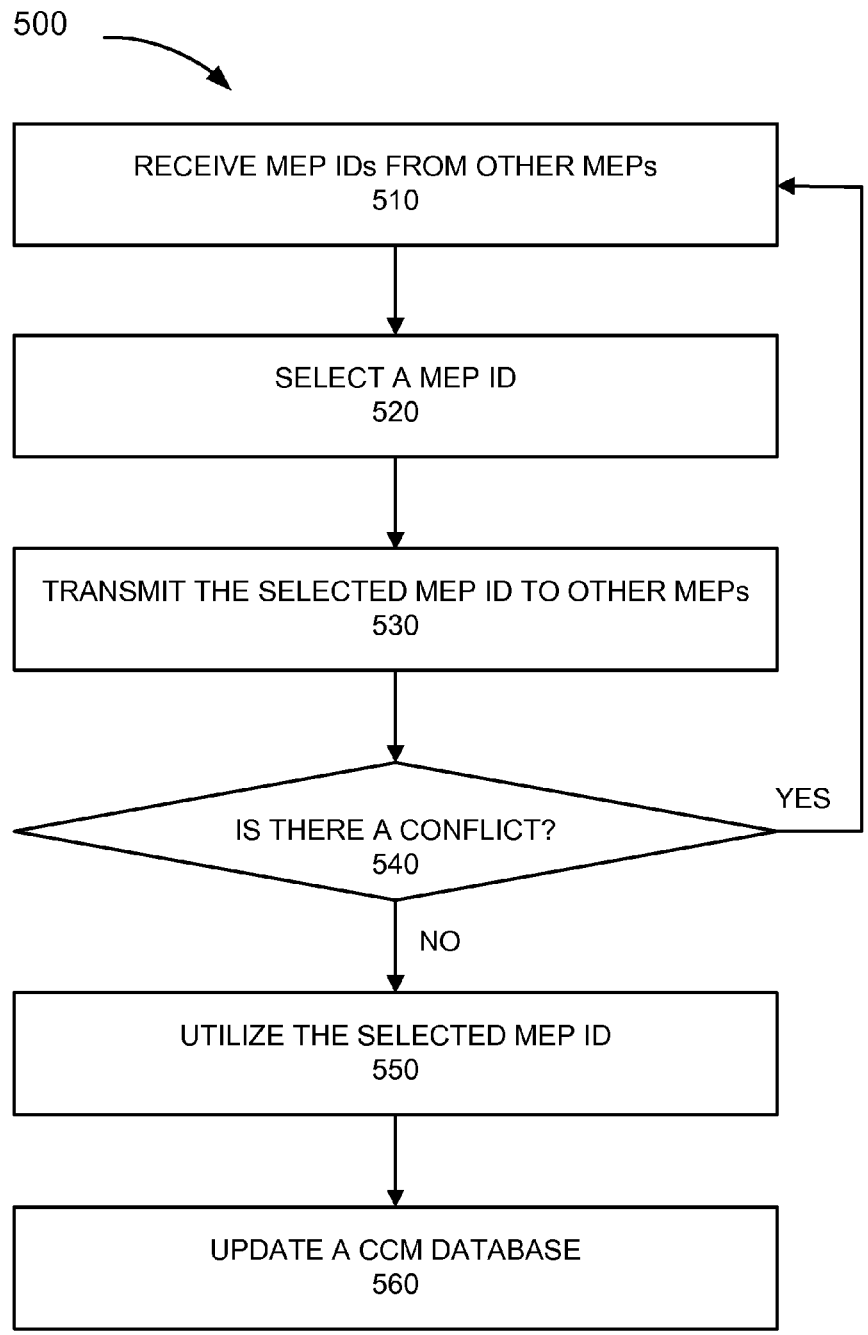
FIG. 5 is a flow chart illustrating an exemplary process associated with the concepts described herein.

FIG. 5 is a flow chart illustrating an exemplary process 500. Process 500 will be described in conjunction with previous Figures. For purposes of discussion, process 500 will be described as being performed by MEPs associated with bridges 205-1, 205-6, and 205-7. Assume that bridge 205-7 and MEP 3 were added to environment 200 but that a MEP ID was not configured (e.g., by the customer, network administrator, etc.).

Process 500 may begin with MEP IDs being received from other MEPs (block 510). Upon connection with environment 200, MEP 3 may listen for CCMs from other MEPs in the MA. As previously described, based on the IEEE standard, MEPs 1 and 2 may periodically transmit CCMs within their MA. Typically, MEPs may multicast CCMs. Although, a MEP may unicast a CCM. MEP 3 may receive CCMs in MEP CCM transmitter/receiver 325. MEP 3 may identify the MEP IDs in each CCM. For example, MEP 3 may inspect MEP ID field 445 of CFM packet 405. MEP 3 may store the MEP IDs in CCM database 340. The time period that MEP 3 receives CCMs before selecting a MEP ID may depend on the periodicity in which CCMs are transmitted.

A MEP ID may be selected (block 520). After the configured time for receiving MEP IDs, MEP 3 may select a MEP ID. For example, in one implementation, MEP ID auto-selector 330 may consult CCM database 340 and identify the MEP IDs that have been received from the other MEPs. MEP ID auto-selector 330 may also identify unused MEP IDs. As previously described, the range of MEP IDs may be preconfigured (e.g., 1-8191). Thus, based on a comparison between the MEP IDs received and the available MEP IDs within the range of MEP IDs, MEP ID auto-selector 330 may select a MEP ID. In another implementation, MEP ID auto-selector 330 may select a MEP ID based on a MAC address. For example, MEP ID auto-selector 330 may identify a MAC address associated with bridge 205-7 and perform a hash of the MAC address to generate a MEP ID value. Since MAC addresses are typically unique in value, the hashing of the MAC address may provide MEP 3 with a MEP ID that is unique within the MA.

The selected MEP ID may be transmitted to other MEPs (block 530). MEP 3 may generate a CCM within CFM packet 405. For example, CCM generator 335 may generate a CCM for transmission to the other MEPs (e.g., MEP 1 and MEP 2) to advertise its selected MEP ID. Since MEP 3 does not have a validated MEP ID at this stage of the process, in one implementation, CCM generator 335 may include a reserved MEP ID as a source MEP ID (i.e., in MEP ID field 445) and the selected MEP ID in one of the CCM TLV fields 455. The reserved MEP ID may be user-selected and may correspond to a MEP ID within the range of available MEP IDs. For example, the reserved MEP ID may be the value 8191. As described below, the reserved MEP ID may indicate to other MEPs that the MEP is seeking to auto-assign a MEP ID. Once the CFM packet 405 that includes the CCM is generated, MEP CCM transmitter/receiver 325 may multicast CFM packet 405 to the other MEPs (i.e., MEPs 1 and 2) in the MA.

It may be determined whether a conflict exists (block 540). MEP CCM transmitter/receiver 325 of MEPs 1 and 2 may receive CFM packet 405 having the selected MEP ID. MEP ID conflict checker 345 may recognize that CFM packet 405 includes the selected MEP ID based on the source MEP ID value (i.e., the reserved MEP ID value) in MEP ID field 445. MEP ID conflict checker 345 may consult CCM database 340 and determine whether the selected MEP ID is available. If MEP 1 or MEP 2 determines that there is a conflict with respect to the selected MEP ID (block 540—YES), then MEP 1 or MEP 2 may transmit a CFM packet 405 indicating that a conflict exists. For example, CCM generator 335 may generate a CFM packet 405 indicating the conflict in one of the CCM TLV fields 455. MEP CCM transmitter/receiver 325 may transmit the CFM packet 405 in a unicast fashion to MEP 3 or a multicast fashion to all MEPs in the MA. As illustrated in FIG. 5, process 500 may then repeat from block 510 and continue until no conflict exits. It will be appreciated that a conflict may arise in various situations, for example, when more than one MEP is added to the MA at approximately the same time. In such instances, it is possible that two MEPs may select the same MEP ID. A conflict response may be sent by the MEP that the MEP ID already belongs.

On the other hand, if MEP 1 and MEP 2 determine that there is no conflict, then the absence of receiving a conflict CCM may allow MEP 3 to determine that the selected MEP ID is available for use. MEP 3 may wait a configured amount of time before determining that the selected MEP ID is available for use. The time period that MEP 3 waits before determining that the selected MEP ID is available for use may depend on the periodicity in which CCMs are transmitted. In another implementation, MEP 1 and MEP 2 may generate a CCM message indicating approval of the selected MEP ID. MEP 1 and MEP 2 may unicast or multicast this message in the MA.

The selected MEP ID may be utilized (block 550). Once MEP 3 determines that the selected MEP ID is available for use, MEP 3 may utilize the selected MEP ID as a source MEP ID. That is, MEP 3 may insert the selected MEP ID in MEP ID field 445 for all subsequent CCMs and/or CFM messages.

A CCM database may be updated (block 560). The MEPs in the MA may update their respective CCM database 340 to include the newly added MEP ID associated with MEP 3.

Although FIG. 5 illustrates an exemplary process 500, in other implementations, fewer, additional, or different processes may be employed. For example, if a MEP is detected as being down (e.g., based on non-receipt of CCMs), the MEP ID associated with that MEP may be freed for MEP ID allocation. For example, the other MEPs may mark the corresponding MEP ID as free in their respective CCM database 340. Further, it will be appreciated that this process may be implemented even where legacy MEPs (i.e., MEPs unable to perform auto-provisioning of MEP IDs) exist. For example, MEP IDs associated with legacy MEPs may be removed from the pool of MEP IDs for MEP ID allocation.

CONCLUSION

The foregoing description of implementations provides an illustration, but is not intended to be exhaustive or to limit the implementations to the precise form disclosed. Modifications and variations are possible in light of the above teachings or may be acquired from practice of the teachings.

In addition, while a series of blocks has been described with regard to the process illustrated in FIG. 5, the order of the blocks may be modified in other implementations. Further, non-dependent blocks may be performed in parallel. Further, it may be possible to omit blocks within process 500.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combination of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such.

What is claimed is:

1. A method comprising:
receiving a first continuity check message (CCM), the first CCM being transmitted to a first network device by a second network device;
determining, based on receiving the first CCM, that the first CCM includes a first maintenance association endpoint (MEP) identifier in a first field of a header of the first CCM;
identifying, based on the first CCM including the first MEP identifier in the first field, a second MEP identifier in a second field of the header, the second MEP identifier being different from the first MEP identifier;
determining whether the second MEP identifier is available to be assigned to the second network device; and
transmitting a second CCM to the second network device when the second MEP identifier is not available to be assigned to the second network device, the second CCM indicating that the second MEP identifier is not available to be assigned to the second network device.

2. The method of claim 1, further comprising:
determining that the second network device is attempting to assign the second MEP identifier to the second network device based on determining that the first field of the header of the first CCM includes the first MEP identifier,
where the second MEP identifier is identified further based on determining that the second network device is attempting to assign the second MEP identifier to the second network device.

3. The method of claim 1, where determining whether the second MEP identifier is available includes:
determining that the second MEP identifier is assigned to the first network device; and
determining that the second MEP identifier is not available to be assigned to the second network device based on the second MEP identifier being assigned to the first network device.

4. The method of claim 1,
receiving, when the second MEP identifier is available to be assigned to the second network device, a third CCM from the second network device;
determining that the third CCM includes the second MEP identifier in a first field of a header of the third CCM, the first field of the header of the third CCM corresponding to the first field of the header of the first CCM; and
associating, based on determining that the third CCM includes the second MEP identifier in the first field of the header of the third CCM, the second MEP identifier with the second network device.

5. The method of claim 1, the method further comprising:
receiving, prior to receiving the first CCM message, a third CCM message, the third CCM message including the first MEP identifier in a first field of a header of the third CCM and the second MEP identifier in a second field of the header; and
where determining whether the second MEP identifier is available to be assigned to the second network device includes:
determining that the second MEP identifier is not available to be assigned to the second network device based on the third CCM message including the second network identifier in the first field of the header of the third CCM.

6. The method of claim 5, further comprising:
receiving, based on transmitting the second CCM, a fourth CCM from the second network device, the fourth CCM including the first MEP identifier in a first field of the header of the fourth CCM and a third MEP identifier in a second field of the header of the fourth CCM,
where the third MEP identifier is different from the first MEP identifier and the second MEP identifier.

7. The method of claim 6, further comprising:
determining whether the third MEP identifier is available to be assigned to the second network device based on the fourth CCM including the first MEP identifier in the first field of the header of the fourth CCM; and
transmitting a fifth CCM message to the second network device when the third MEP identifier is not available to be assigned to the second network device, the fifth CCM indicating that the third MEP identifier is not available to be assigned to the second network device.

8. A device comprising:
one or more processors to:
receive a first continuity check message (CCM),
determine that the first CCM includes a first maintenance association endpoint (MEP) identifier in a first field of a header of the first CCM,
identify a second MEP identifier in a second field of the header based on the first CCM including the first MEP identifier in the first field, the second MEP identifier being different from the first MEP identifier,
determine whether the second MEP identifier is available to be assigned, and
transmit a second CCM when the second MEP identifier is available to be assigned, the second CCM indicating that the second MEP identifier is available to be assigned.

9. The device of claim 8, where the one or more processors are further to:
determine that a transmitting device, that transmits the first CCM to the device, is attempting to assign the second MEP identifier to the transmitting device based on determining that the first field of the header of the first CCM includes the first MEP identifier,
where the second MEP identifier is identified further based on determining that the transmitting device is attempting to assign the second MEP identifier to the transmitting device.

10. The device of claim 8, where first field of the header of the first CCM comprises a source MEP identifier field for indicating an MEP identifier of a transmitting device that transmits the first CCM.

11. The device of claim 8, where the device determines that the second MEP identifier is not associated with the device, and
where the one or more processors are further to:
transmit, based on determining that the second MEP identifier is not associated with the device, a third CCM that indicates that the second MEP identifier is not associated with the device.

12. The device of claim 11, where, when transmitting the third CCM, the one or more processors are to:
multicast the third CCM to a plurality of devices included in a maintenance association (MA) associated with the device.

13. The device of claim 8, where the one or more processors determine that the second MEP identifier is associated with the device, and
where the one or more processors are further to:
receive, based on transmitting the second CCM, a third CCM from a second device that transmitted the first CCM to the device, the third CCM including the first MEP identifier in a first field of the header of the third CCM and a third MEP identifier in a second field of the header of the third CCM,
where the third MEP identifier is different from the first MEP identifier and the second MEP identifier.

14. The device of claim 13, where the one or more processors are further to:
determine whether the third MEP identifier is available to be assigned to the second device based on the third CCM including the first identifier in the first field of the header of the third CCM, and
transmit a fourth CCM message to the second device when the third MEP identifier is not available to be assigned to the second device, the fourth CCM indicating that the third MEP identifier is not available to be assigned to the second device.

15. A non-transitory computer-readable medium storing instructions, the instructions comprising:
one or more instructions which, when executed by a processor of a network device, cause the processor to:
receive, from a first network device, a first continuity check message (CCM),
determine that the first CCM includes a first maintenance association endpoint (MEP) identifier in a first field of a header of the first CCM,
identify a second MEP identifier in a second field of the header based on the first CCM including the first MEP identifier in the first field, the second MEP identifier being different from the first MEP identifier,
determine whether the second MEP identifier is available to be assigned to the first network device, and
transmit a second CCM message when the second MEP identifier is not available to be assigned to the first network device, the second CCM indicating that the second MEP identifier is not available to be assigned to the first network device.

16. The non-transitory computer-readable medium of claim 15, where the instructions further comprise:
one or more instructions to determine, based on the first field of the header of the first CCM including the first MEP identifier, that the first network device is attempting to auto-assign the second MEP identifier.

17. The non-transitory computer-readable medium of claim 15, where the one or more instructions to determine whether the second MEP identifier is available include:
one or more instructions to determine that the second MEP identifier is assigned to a second network device, and
one or more instructions to determine that the second MEP identifier is not available based on the second MEP identifier being assigned to the second network device.

18. The non-transitory computer-readable medium of claim 15, where the instructions further comprise:
one or more instructions to receive, when the second MEP identifier is available to be assigned to the second network device, a third CCM from the second network device,
one or more instructions to determine that the third CCM includes the second MEP identifier in a first field of a header of the third CCM, the first field or the header of the third CCM corresponding to the first field of the header of the first CCM, and
one or more instructions to associate, based on determining that the third CCM includes the second MEP identifier in the first field of the header of the third CCM, the second MEP identifier with the second network device.

19. The non-transitory computer-readable medium of claim 15, where the instructions further comprise:
one or more instructions to receive, based on transmitting the second CCM, a third CCM from the first network device, the third CCM including the first MEP identifier in a first field of the header of the third CCM and a third MEP identifier in a second field of the header of the third CCM,
where the third MEP identifier is different from the first MEP identifier and the second MEP identifier.

20. The non-transitory computer-readable medium of claim 19, where the instructions further comprise:
one or more instructions to determine whether the third MEP identifier is available to be assigned to the first network device based on the third CCM including the first identifier in the first field of the header of the third CCM, and
one or more instructions to transmit a fourth CCM message to the first network device when the third MEP identifier is not available to be assigned to the first network device, the fourth CCM indicating that the third MEP identifier is not available to be assigned to the first network device.

* * * * *